Patented Feb. 16, 1932

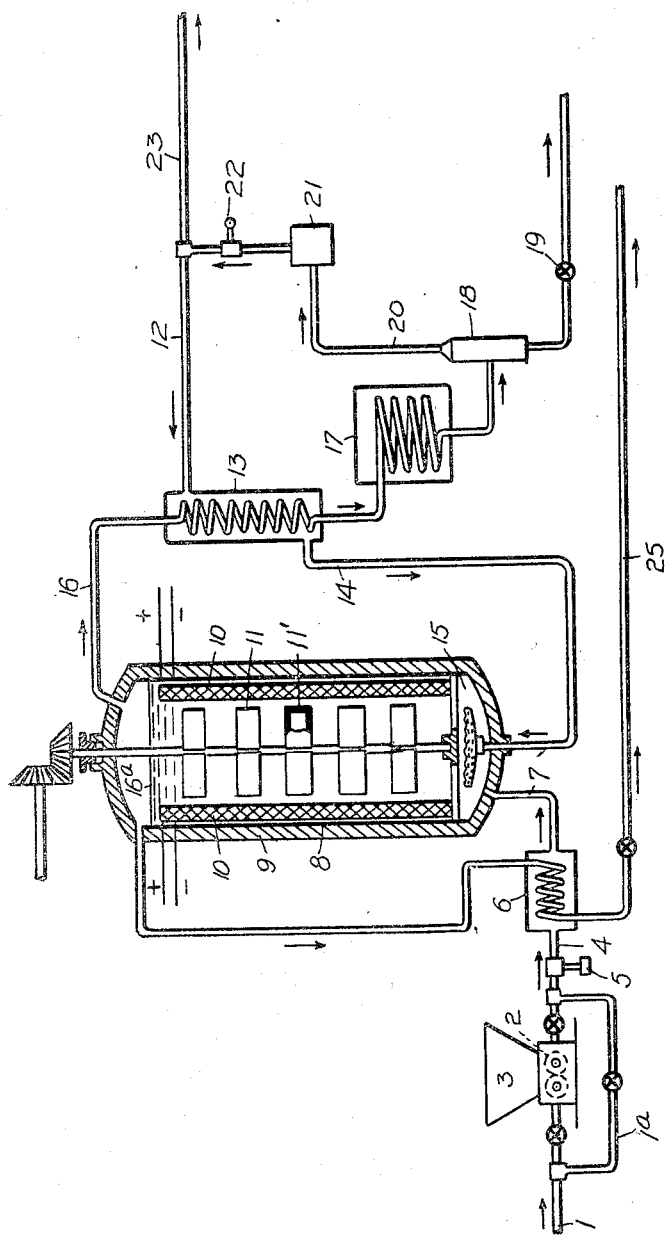

1,845,555

UNITED STATES PATENT OFFICE

MATHIAS PIER, OF HEIDELBERG, AND WALTER SIMON, OF LUDWIGSHAFEN-ON-THE-RHINE, GERMANY, ASSIGNORS, BY MESNE ASSIGNMENTS, TO STANDARD-I. G. COMPANY, OF LINDEN, NEW JERSEY, A CORPORATION OF DELAWARE

LIQUID AND OTHER HYDROCARBONS AND DERIVATIVES THEREOF BY THE DESTRUCTIVE HYDROGENATION OF CARBONACEOUS MATERIALS

Application filed March 31, 1928, Serial No. 266,448, and in Germany August 11, 1926.

The present invention relates to the manufacture and production of valuable liquid and other hydrocarbons and derivatives thereof by the destructive hydrogenation of carbonaceous materials such as the various kinds of coal, tars, mineral oils, distillation, extraction and conversion products thereof and the like by treatment with hydrogen or gases containing or giving rise to hydrogen at an elevated temperature and under pressure with the aid of catalysts.

We have found that when working according to this process very valuable results are obtained by the employment of catalysts containing small amounts of silver or mixtures of copper with about equimolecular amounts of zinc or cadmium either in a free or combined state and in addition thereto boron or aluminium or silicon or titanium or vanadium or tantalum or chromium or molybdenum or tungsten in a free or combined state or cobalt in a combined state or mixtures thereof. As compounds of the aforesaid elements may be mentioned the oxides, hydroxides, carbonates, phosphates, sulphates and the like. The first mentioned group of constituents which should be present only in small quantities, may be employed in such quantities as amount to about 10 per cent of the catalysts. These new catalysts may be employed either alone or in mixture with other suitable catalysts or with inert materials. Examples of inert materials are clay, active coal, asbestos and the like. The process is carried out under pressure preferably under high pressure of 50 atmospheres or more. Preferably the reaction is carried out at temperatures above 400° centigrade. The hydrogen is preferably employed in a large excess. Instead of elementary hydrogen, gas mixtures containing hydrogen may also be employed, or gases may be used which contain combined hydrogen and from which the hydrogen it set free by suitable treatment, as for example from methane by decomposition and from water vapor by the action of carbon monoxide or hydrocarbons and the like; the production of hydrogen in this manner may also take place in the reaction vessel itself. Preferably the hydrogenating gas is employed in a circulatory system while replacing the comsumed portion of the gas by fresh gas.

Intimate contact between the materials to be treated and the hydrogenating gas may be effected for example by stirring or by exposing the initial materials to the hydrogenating gas in thin layers or by atomizing or spraying the initial materials, also by the employment of porous layers or plates on which the material to be treated rests and through which the hydrogenating gas is pressed in. Such amounts of catalyst in reference to the amount of material to be subjected to the destructive hydrogenation are employed, that the whole amount of the initial material to be converted comes into sufficient contact with the catalyst.

Those parts of the apparatus which come into contact with the hot reacting materials should preferably be kept free from all such substances as would lead to the separation of carbon and the formation of methane. With this end in view the said parts of the apparatus may be made of or coated with aluminium or highly alloyed steels. In the accompanying drawing an apparatus for carrying out the process according to the present invention is illustrated diagrammatically partly in vertical section. The invention is, however, not limited to the apparatus illustrated which may be varied at will in accordance with the conditions of working. Referring to the drawing in detail reference numeral 1 indicates a feed line from any convenient source of liquid raw material. The line 1 discharges to a grinding mechanism 2 fitted with a hopper 3 through which solid materials may be admitted. If desired, the grinding mechanism can be by-passed by line 1a when no solid materials are used. The suspension of solid materials in liquid or the liquid alone may be then forced by pump 5 through a line 4 to a heat exchanger 6 and thence by line 7 into a reaction chamber 8. The reaction chamber is constructed in any preferred manner and should be adapted to withstand high pressures, for example, 20, 100 or even as high as 1000 atmospheres, as well as the corrosive effects of the reactants.

The vessel is preferably protected from loss of heat by a suitable insulating cover 9 and may be heated by electric coils 10 which are arranged within the drum. The contents of the drum are preferably kept in a state of agitation by means of a stirring mechanism 11 and the catalytic materials 11' as indicated above may be attached to the stirring mechanism so that the catalyst is brought into intimate contact with the contents of the vessel.

Hydrogen under high pressure is forced through a line 12, heat exchanger 13 and then by line 14 into the base of the reactor 8 into which it is preferably discharged through a spray pipe 15. A liquid level may be maintained in the drum, for example at the point 16a and gas and vaporous products may be continuously withdrawn by vapor line 16 which is in communication with exchanger 13 and a cooling coil or condenser 17. The condensate and gas is discharged into a separating drum 18 from which the distillate is removed by line 19 to storage, not shown. The gas may be taken off by a pipe 20 to a purifying system indicated at 21, and which may comprise a scrubbing system preferably carried out at high pressure using, for example, soda to remove hydrogen sulfide and oil to remove hydrocarbon constituents from the gas. Purified gas is then recompressed by a booster pump 22 and is forced again into the hydrogen feed line 12. Fresh hydrogen may be introduced by line 23. If desired, oil may be continuously removed from the drum by a line 24 which communicates with heat exchanger 6 and which is withdrawn to storage, not shown, by a suitable line 25.

The following examples will further illustrate how the said invention may be carried out in practice, but the invention is not limited thereto.

*Example 1*

Crude cresylic acid from lignite tar is passed in a current of hydrogen in excess under a pressure of 200 atmospheres at 450° centigrade over a catalyst consisting of tantalic acid with about 10 per cent of silver. Those parts of the apparatus, which are hot and come into contact with the reacting materials consist of chromium-nickel-steel. On cooling the gases and vapors leaving the reaction vessel a liquid product entirely free from phenols is obtained, which consists in the main of toluene and a certain amount of benzene and hydroaromatic hydrocarbons.

*Example 2*

Tar obtained by the low temperature carbonization of German lignites, which contains phenols, is converted into a product of the nature of middle oils by means of hydrogen under a pressure of 200 atmospheres and at 420° centigrade with the addition of bauxite as a catalyst; this product is then passed in a vaporous state in a current of hydrogen in excess at 450° centigrade and under a pressure of 200 atmospheres over a catalyst consisting of molybdic acid with 10 per cent of silver. The hydrogen is pumped round in the circulatory system, the gas consumed in the reaction being replaced by fresh gas. On cooling the vapors issuing from the reaction vessel, a liquid product is obtained which is free from phenols and is completely saturated, and which contains more than 90 per cent of benzine.

*Example 3*

Crude American mineral oil is treated in the liquid state, with the addition of Florida earth as a catalyst, whilst efficiently stirring, with hydrogen at a temperature of 420° centigrade and under a pressure of 200 atmospheres, a product of the nature of the middle oils being thus obtained. The vapors of the said product are then passed over a catalyst consisting of silicic acid together with about 10 per cent of a mixture of copper and zinc, the said catalyst being fixedly arranged in the reaction vessel. The process is carried out in a circulatory system, and care is taken that an excess of hydrogen is always present, and that the hydrogen consumed in the reaction is always replenished by fresh gas, the pressure being continuously maintained. On cooling the products coming from the reaction vessel, a liquid product is obtained containing 70 to 80 per cent of benzine.

What we claim is:—

1. A process for destructive hydrogenation of bituminous materials which comprises acting on said materials with hydrogen at a temperature sufficient to effect the conversion, and a pressure of at least 50 atmospheres in the presence of a catalyst containing at least two constituents, the one being selected from the group consisting of silver, mixtures of copper with zinc and mixtures of copper with cadmium, and being present in amounts up to and about 10 per cent and the other comprising a substantially larger amount of a substance selected from the class consisting of aluminium, titanium, vanadium, tantalum, molybdenum, chromium, tungsten, their oxides and oxy acids.

2. A process for the destructive hydrogenation of bituminous materials which comprises acting on said materials with a stream of hydrogen at a temperature sufficient to effect the conversion, and a pressure of at least 50 atmospheres in the presence of a catalyst containing at least two constituents, the one being selected from the group consisting of silver, mixtures of copper with zinc and mixtures of copper with cadmium, and being present in amounts up to and about 10 per cent and the other comprising a substantially larger amount of a substance selected from the class consisting of aluminium, titanium, vanadium, tantalum, molybdenum, chromium, tungsten, their oxides and oxy acids.

3. A process as defined in claim 2 wherein the hydrogen is employed in a large excess.

4. A process as defined in claim 1 wherein the temperature is at least 400° C.

5. A process for the destructive hydrogenation of carbonaceous materials which comprises acting on said materials with hydrogen at a temperature sufficient to effect the conversion and a pressure of at least 50 atmospheres in the presence of a catalyst containing at least two constituents, the one being selected from the group consisting of silver, mixtures of copper with zinc and mixtures of copper with cadmium and being present only in amounts of up to and about 10 per cent, and the other comprising a substantially larger amount of a substance selected from the class consisting of aluminum, titanium, vanadium, tantalum, their oxides and oxy acids.

6. A process for the destructive hydrogenation of bituminous materials which comprises acting on said materials with hydrogen at a temperature sufficient to effect the conversion and a pressure of at least 50 atmospheres in the presence of a catalyst containing at least two constituents, the one being selected from the group consisting of mixtures of copper with zinc and mixtures of copper with cadmium, and being present in amounts of up to and about 10 per cent, and the other comprising a substantially larger amount of a substance selected from the class consisting of tungsten, its oxides and oxy acids.

7. A process for the destructive hydrogenation of bituminous materials which comprises acting on said materials with hydrogen at a temperature sufficient to effect the conversion and a pressure of at least 50 atmospheres in the presence of a catalyst containing at least two constituents, the one being selected from the group consisting of mixtures of copper with zinc and mixtures of copper with cadmium, and being present in amounts of up to and about 10 per cent, and the other comprising a substantially larger amount of a substance selected from the class consisting of chromium, its oxides and oxy acids.

In testimony whereof we have hereunto set our hands.

MATHIAS PIER.
WALTER SIMON.